(12) United States Patent
Marzorati et al.

(10) Patent No.: US 10,277,612 B2
(45) Date of Patent: Apr. 30, 2019

(54) AUTONOMIC EXCLUSION IN A TIERED DELIVERY NETWORK

(71) Applicant: International Business Machines Corporation, Armonk, NY (US)

(72) Inventors: Mauro Marzorati, Lutz, FL (US); Aaron Keith Baughman, Silver Spring, MD (US); Gary Francis Diamanti, Wake Forest, NC (US); Elizabeth Merckel Valletti, Palm Harbor, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/867,367

(22) Filed: Sep. 28, 2015

(65) Prior Publication Data

US 2017/0093888 A1    Mar. 30, 2017

(51) Int. Cl.

| H04L 29/06 | (2006.01) |
|---|---|
| H04L 29/08 | (2006.01) |
| H04L 12/26 | (2006.01) |
| G06F 21/56 | (2013.01) |

(52) U.S. Cl.
CPC .......... *H04L 63/1416* (2013.01); *G06F 21/56* (2013.01); *H04L 43/08* (2013.01); *H04L 63/1441* (2013.01); *H04L 67/02* (2013.01); *H04L 67/146* (2013.01)

(58) Field of Classification Search
CPC .. H04L 63/1416; H04L 63/1425; H04L 67/02

USPC .......................................................... 726/23
See application file for complete search history.

(56) References Cited

U.S. PATENT DOCUMENTS

| 8,370,937 B2 | 2/2013 | Gal et al. |
| 8,601,586 B1 | 12/2013 | Boutros et al. |
| 8,763,120 B1 | 6/2014 | Forristal |
| 8,789,180 B1 | 7/2014 | Yang et al. |
| 8,793,780 B2 | 7/2014 | Suffling |
| 2005/0086499 A1* | 4/2005 | Hoefelmeyer ........ H04L 63/145 713/188 |
| 2010/0325357 A1* | 12/2010 | Reddy ..................... G06F 21/53 711/118 |
| 2012/0204262 A1 | 8/2012 | Thomas et al. |
| 2012/0304244 A1* | 11/2012 | Xie ........................ G06F 21/00 726/1 |
| 2013/0291107 A1 | 10/2013 | Marck et al. |
| 2014/0196141 A1 | 7/2014 | Ji et al. |

(Continued)

*Primary Examiner* — Dao Q Ho
(74) *Attorney, Agent, or Firm* — William Stock

(57) ABSTRACT

An edge device is dynamically reconfigured to block undesired traffic using control information that originates in a core network. The control information is delivered to the device indirectly and, in particular, by a core appliance (e.g., an intrusion prevention system) setting and returning an HTTP cookie to a requesting client. The edge device is pre-configured to respond to HTTP cookies that have (or that are) control information. When the receiving client later returns that cookie to the edge device to obtain subsequent service, the control information that originated at the core is used by the device to deny that service. This indirect method of communicating the control information (from the core to the requesting client and then back to the device) enables the device to be reconfigured dynamically as needed to address network exploits or other threats.

21 Claims, 5 Drawing Sheets

(56) References Cited

U.S. PATENT DOCUMENTS

2014/0230058 A1    8/2014  Shulman et al.
2014/0325653 A1*  10/2014  Altman ............... H04L 63/1416
                                                              726/23

* cited by examiner

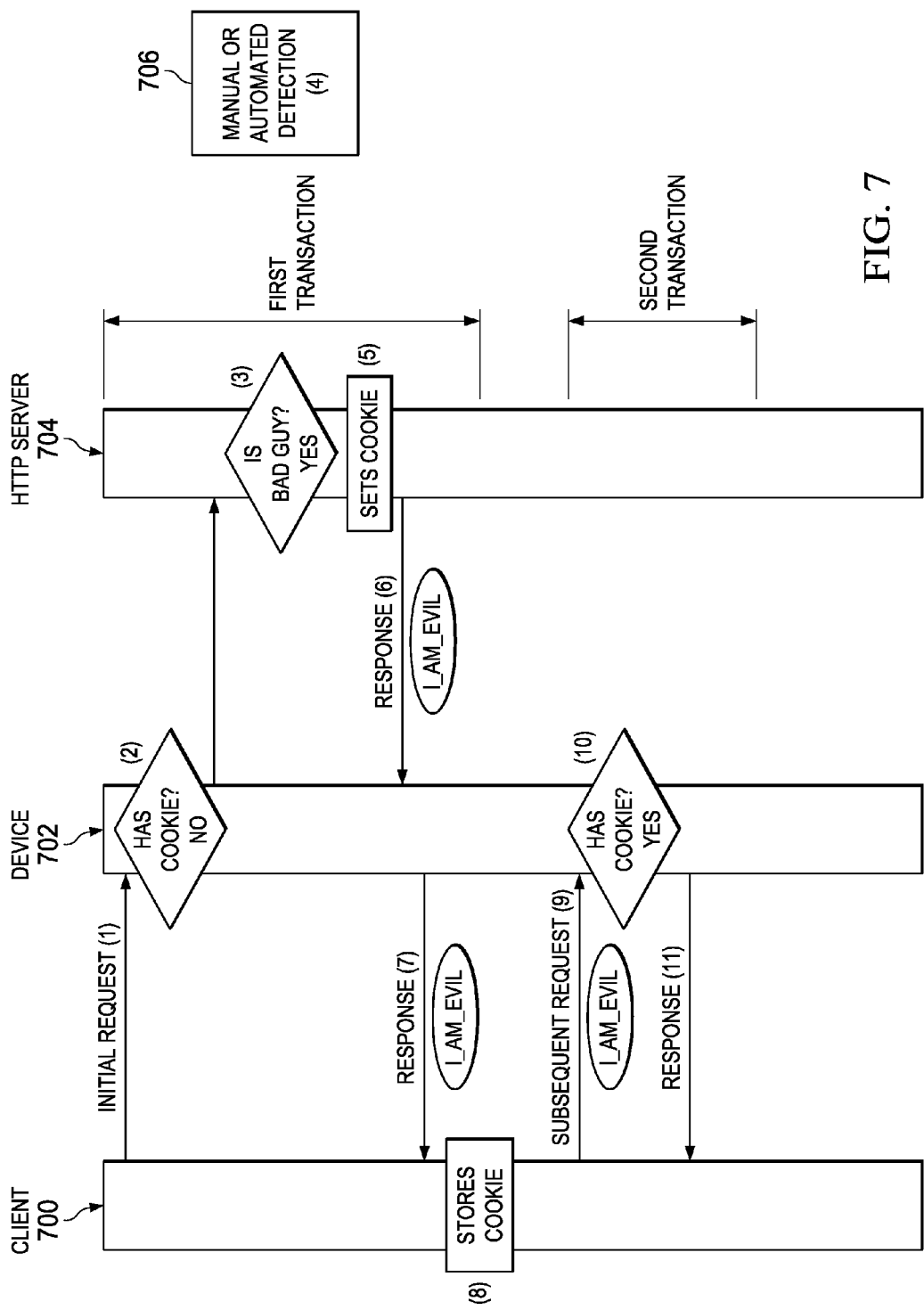

AUTONOMIC EXCLUSION IN A TIERED DELIVERY NETWORK

BACKGROUND OF THE INVENTION

Technical Field

This disclosure relates generally to web application security.

Background of the Related Art

Today, most organizations depend on web-based software and systems to run their business processes, conduct transactions with suppliers, and deliver sophisticated services to customers. Unfortunately, many organizations invest little to no effort in ensuring that those applications are secure. Web-based systems can compromise the overall security of organizations by introducing vulnerabilities that hackers can use to gain access to confidential company information or customer data. For example, HTTP-borne attacks can spring up out of nowhere, and their success or failure often hinges on the preparedness of the intended victim to repel the attack. One particularly effective attack exploits a previously unknown and undisclosed vulnerability. These are termed zero-day attacks. The success (or failure) of such attacks is inversely related to the speed of execution of the victim in reacting and marshalling resources to respond.

Modern web delivery infrastructure comprise a multitude of different devices all acting in concert to provide the desired functionality. Generally speaking, the delivery infrastructure includes a self-managed portion of the computing facilities—usually termed "core"—and an outsourced portion—usually termed "cloud." One specific function that is acquired over cloud providers is a Content Delivery Network, or CDN, which leverages a service provider's geographical dispersal along with unified command-and-control facilities. This dispersal allows for content to be staged geographically close to requesting end users and therefore to achieve significant throughput increases on a web application. Given this model, servers in the CDN may be the first point of contact between the end-user and the web application. CDNs are very effective, but due to their size and geographical dispersal, configuration of the network may be time-consuming. In particular, reconfiguring devices that are located away from the core is difficult, and thus counterattacks on certain vulnerabilities (such as zero-day attacks that originate over HTTP) may be harder to address when they are first encountered at the edge of the network.

BRIEF SUMMARY

According to this disclosure, a device located away from the core (e.g., at the edge of a network) is dynamically reconfigured to block undesired traffic (e.g., an HTTP-based zero-day exploit) using control information that originates in the core. Preferably, the control information is delivered to and instantiated in the edge device indirectly and, in particular, by a core appliance setting and returning to a requesting client (typically via the edge device) an HTTP cookie in a conventional manner. A representative core appliance is a network security appliance, such as an intrusion detection system (IDS), an intrusion prevention system (IPS), or the like, although this is not a limitation. In one embodiment, the control information is an HTTP cookie itself, or a value set in an HTTP cookie. The edge device is pre-configured to respond to HTTP cookies that have (or that are) control information. Because the control information is provided using a cookie, however, a receiving client (which may be malicious) will respond to it in a standards-compliant manner. Thus, when the receiving client later returns that cookie to the edge device to obtain subsequent service, the control information that originated at the core is used by the device, e.g., to deny that service, or to take some other configured action. This indirect method of communicating the control information (from the core to the requesting client and then back to the device) enables the device to be reconfigured dynamically or "on-the-fly" as needed to address network exploits.

The foregoing has outlined some of the more pertinent features of the disclosed subject matter. These features should be construed to be merely illustrative. Many other beneficial results can be attained by applying the disclosed subject matter in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which:

FIG. 7 depicts a second embodiment wherein a partially manual attack detection approach is used to generate the control information.

DETAILED DESCRIPTION OF AN ILLUSTRATIVE EMBODIMENT

Figure 1:
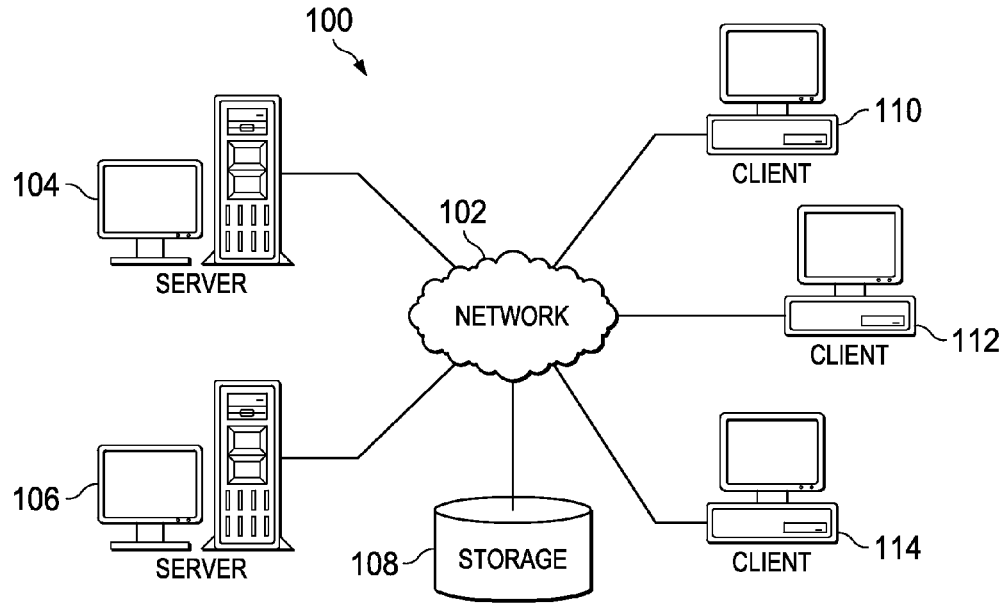
FIG. 1 depicts an exemplary block diagram of a distributed data processing environment in which exemplary aspects of the illustrative embodiments may be implemented.
Figure 2:
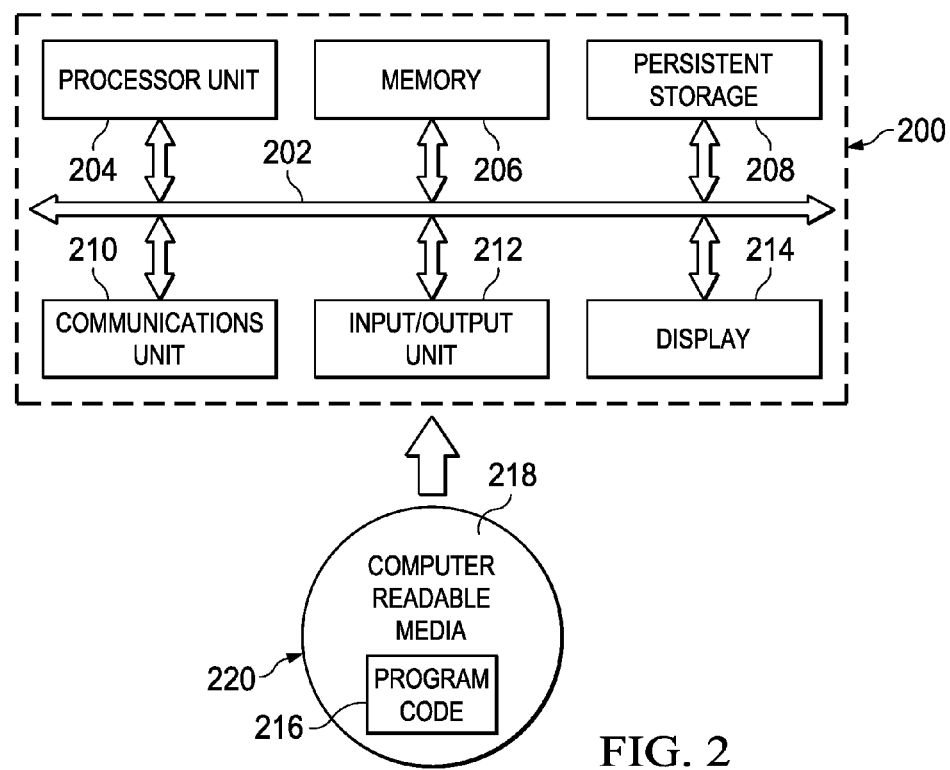
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

Client-Server Technologies

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device.

Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C, or the like, and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Detecting Malicious Software

The number and intensity of Web-related threats to enterprise networks is at an all-time high. These rising threats, along with the countless vulnerabilities inherent in Web applications, make blocking attack attempts an ongoing battle. To help preempt attacks on a network from known and unknown sources, it is known to provide Web application security software support. One commercial solution of this type is IBM Proventia® Web application security software, which may be embedded in existing network and server intrusion prevention system (IPS) products and services. This functionality helps control attacks at the network, gateway and server levels of an enterprise network, thereby enabling a strengthened overall security posture.

Figure 3:
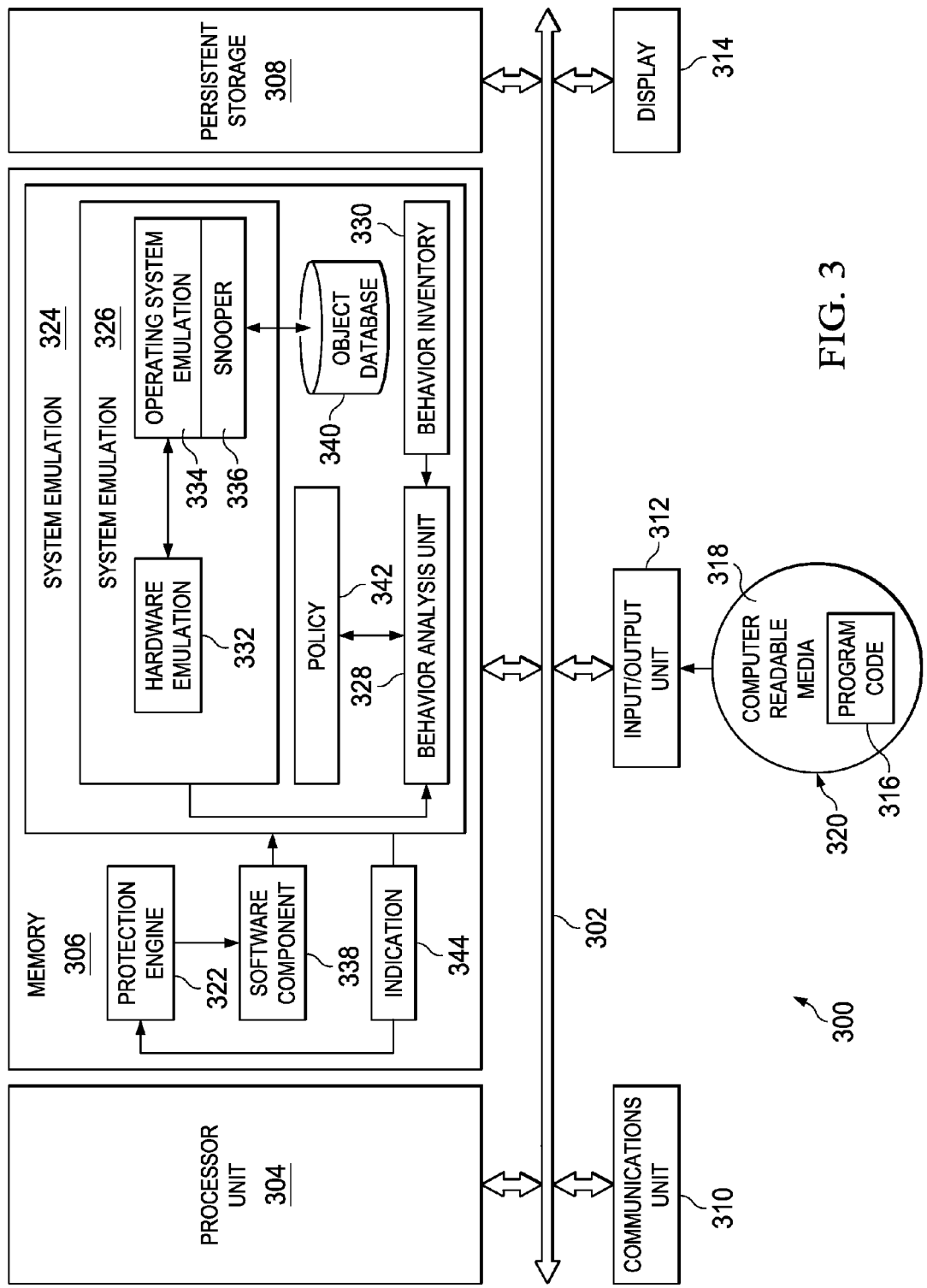
FIG. 3 illustrates an exemplary data processing system architecture for detecting malicious software.

FIG. 3 depicts the data processing system in FIG. 1 that has been extended or enhanced to detect malicious software (or, more generally, traffic). As depicted, that system comprises protection engine 322 and virus protection system 324 located within memory 306. These components may be part of a security system used to detect and block the execution of malicious code within data processing system 300. These components may be found within a software application, such as IBM Proventia Network Intrusion Prevention System (IPS).

Virus protection system 324 includes system emulation 326, behavior analysis unit 328, and behavior inventory 330, snooper 336, object database 340, and policy 342. System emulation 326 is an emulation of components within data processing system 300. Hardware emulation 332 emulates hardware within data processing system 300. Operating system emulation 334 provides an emulation of the operating environment within data processing system 300 for software components. Snooper 336 detects calls made by a software component of interest, such as software component 338 executing within system emulation 326. Snooper 336 selectively places calls or records of calls into behavior inventory 330 using object database 340. Object database 340 contains an identification of components considered to be suspicious components. In operation, snooper 336 compares the name of the components referenced by the call to components identified within object database 340. If a match is present, snooper 336 places the call type with the named components into behavior inventory 330 for further analysis. The collection of this information during the execution of software component 338 forms a series of call types to named components for analysis by behavior unit 328.

Virus protection system 324 may implement processes in behavior analysis unit 328 to detect various threats from malicious software components. For example, behavior analysis unit 328 contains processes used to analyze calls made by software component 338 executing within system emulation 326. Behavior analysis unit 328, in these examples, looks at a series of call types to named components using policy 342 to determine whether those calls to the named components indicate that software component 338 is a malicious one. The series of call types to named components also may be referred to as a pattern.

Policy 342 may be, for example, a set of rules and/or a set of patterns used to determine whether the series of call types to named components within inventory 330 indicate that software component 338 is a malicious software component. A pattern within policy 342 may be a series of call types to named components that have been identified indicating behavior of a malicious software component. In these examples, behavior analysis unit 328 may be implemented using various known analysis processes currently available in virus protection systems. These processes may be modified to encompass analyzing these series of call types to named components. The named components referenced by the calls may be names of specific software components. These software components may be, for example, without limitation, dynamic link libraries, executable files, data files, configuration files, Universal Resource Locators, Universal Resource Names, and Universal Resource Identifiers. Additional examples of software components are Active X controls, object linking and embedding (OLE) controls, Java™ programs, and applets.

Behavior inventory 330 is an example of a collection of data that may be used by behavior analysis unit 328 to determine whether the series of calls made by a software component 338 is indicative of a malicious software component. Behavior inventory 330 contains a series of call types to named objects that have been identified as being suspicious by snooper 336. A series of call types to named components, in one example, is an identification of calls in the order in which calls are made. The call types may be, for example, calls to read a file, save a file, write data into a file, write a value into a register, read a register, write data into a buffer, or otherwise access a file or other resource in a data processing system. Additional examples of call types may be ones that invoke a function in an external software component, connect to a network or network host, transfer data over a network, delete a file, rename a file, or write to a system configuration data repository.

Typically, behavior inventory 330 is generated each time a software component, such as software component 338 is executed within system emulation 326. Behavior inventory 330 contains data used by behavior analysis unit 328 to determine whether software component 338 is a malicious software component. Behavior inventory 330 contains an identification of call types made to named components selected by snooper 336. The collection of data within behavior inventory 330 may take the form of records in which each record identifies a call type and a named component. Further, these records may be placed into behavior inventory 330 in the order as identified by snooper 340 to form a series of sequential call types to named components for analysis. The determination as to whether a pattern within behavior inventory 330 is indicative of malicious made by behavior analysis unit 328.

In operation, when a request is made with respect to software component 338, protection engine 322 may send software component 338 to virus protection system 324 for analysis prior to determining whether to actually perform the request. This request may be, for example, a request to save software component 338 or to execute software component 338. In response to a request, protection engine 322 sends software component 338 to virus protection system 324. In response, virus protection system 324 allows software component 338 to execute within system emulation 326 for some selected period of time. During execution, software component 338 may make calls. These calls are a series of call types to named components. System emulation 326 emulates the execution of these calls, but does not actually allow the calls to be executed out of system emulation 326. In other words, software component 338 believes that a particular call has been made and receives a response to the call. For example, if software component 338 makes a call to access a function in a specific dynamic link library, operation system emulation 334 processes the call and returns a response as if the call was actually made to the specific dynamic link library.

All of these calls and responses occur within system emulation 326 in a manner that none of the calls made by software component 338 within system emulation 326 actually occur with respect to the actual operating system. As a result, no harm or damage may occur to other software components within data processing system 300 outside of system emulation 326. In this manner, software component 338 may be isolated and examined without risk of harm to the actual operating environment for data processing system 300. Snooper 336 detects call types to the named components. In response to detecting a call, snooper 336 compares the named components of the call to components within object database 340. If a match is found, the call type to a particular named component is considered a suspicious component. This call type and the named component are placed into behavior inventory 330. As a result, during execution of software component 338, a set of call types to named components may be created in behavior inventory 330.

At some point in time, such as when software component 338 completes execution or in response to some other event, the series of call types to named components with behavior inventory 330 are analyzed by behavior analysis unit 328. Behavior analysis unit 328 takes this pattern formed by the series of call types to named components to policy 342 to determine whether software component 338 is a malicious software component. In other words, snooper 336 is notified each time software component 338 accesses another external component or resource. Behavior analysis unit 328 compares the pattern identified for software component 338 in behavior inventory 330 to those patterns in policy 342 to determine whether a match occurs. Further, an exact match may not be needed in all cases. If the pattern for software component 338 is close enough to a particular pattern within policy 342, software component 338 also may be identified as being a malicious software component.

The result of this analysis by behavior analysis unit 328 is sent to protection engine 322 in indication 344. If indication 344 indicates that software component 338 is not a malicious software component, protection engine 322 then performs the request. For example, protection engine 322 may allow software component 338 to execute in the actual operating system of data processing system 300. In other examples, protection engine 322 may save software component 338. If indication 344 indicates that software component 338 is a malicious component, protection engine 322 does not perform the request for software component 338. Protection engine 322 may generate a signature from software component 338 for future use. The signature for software component 338 may then be placed in a list or database for future reference such that another analysis of software component 338 does not have to be performed by virus protection system 324.

Generalizing, the above-described mechanism monitors network flows to detect malicious traffic. One or more signatures representing the malicious traffic are then generated and stored for use by other systems, e.g., intrusion prevention systems, intrusion detection systems, or the like.

Tiered Delivery Using the Cloud Model

Figure 4:
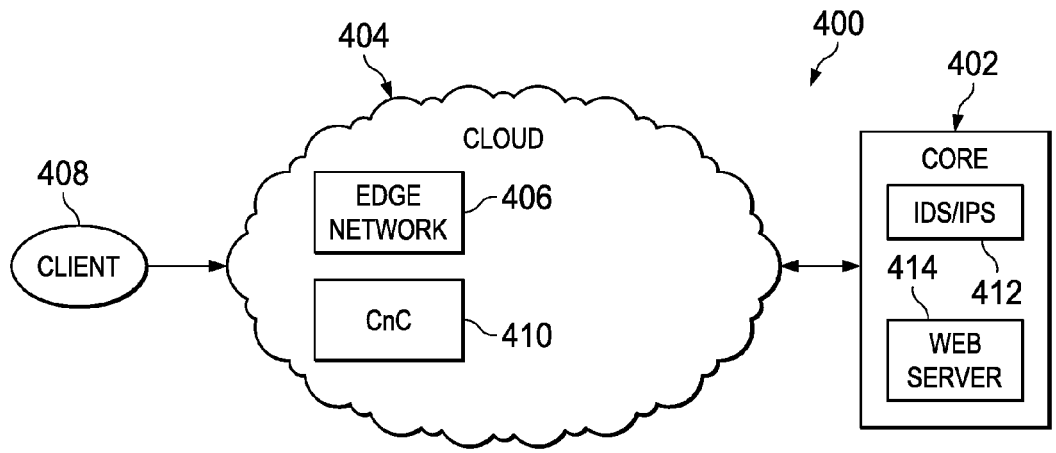
FIG. 4 depicts a tiered delivery infrastructure for a Web application that includes both core and cloud-based components.

As noted, and as depicted in FIG. 4, a web delivery infrastructure 400 typically includes a self-managed portion of the computing facilities, which is sometimes referred to herein as the "core" 402, and an outsourced portion, which is sometimes referred to herein as the "cloud" 404. Cloud services are often provided by third party service providers.

One type of "cloud" offering is "cloud computing" by which shared resources, software and information are provided over the Internet to computers and other devices on-demand. Cloud computing can significantly reduce IT costs and complexities while improving workload optimization and service delivery. With this approach, an application instance can be hosted and made available from Internet-based resources that are accessible through a conventional Web browser over HTTP. An example application might be one that provides a common set of messaging functions, such as email, calendaring, contact management, and instant messaging. A user would then access the service directly over the Internet. Using this service, an enterprise would place its email, calendar and/or collaboration infrastructure in the cloud, and an end user would use an appropriate client to access his or her email, or perform a calendar operation.

In an arrangement such as described above, cloud compute resources typically are housed in large server farms that run one or more network applications, typically using a virtualized architecture wherein applications run inside virtual servers, or so-called "virtual machines" (VMs), that are mapped onto physical servers in a data center facility. The virtual machines typically run on top of a hypervisor, which is a control program that allocates physical resources to the virtual machines.

More generally, cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

Another type of cloud service provides for tiered delivery such a content delivery network (or "CDN"). A content delivery network typically comprises a plurality of servers that are located close to end user access networks, together with command and control systems that direct end user requests for content to the servers in lieu of those requests being handling (in the first instance) at the core/origin. The end user access networks are sometimes referred to as the "edge" and one such edge network 406 is depicted in FIG. 4. Some of the effectiveness of a delivery (or "edge") network of this type is its ability to cache objects at the edge. Thus, in a typical use case, a web application is "delivered" over the CDN, which may be configured by aliasing to the CDN a hostname of the application. Requests to that hostname that originate from end user client 408 are then redirected (e.g., by the CDN command and control system 410) to the edge servers for initial handling. In this manner, and because they are located intermediate the requesting end user clients and the core, the servers in the delivery network are well-positioned to intercept all in-bound web traffic that may be intended for the Web application. If the request cannot for some reason be handled by the server at the edge, it may be directed to the core. A cloud service provider with broad geographical dispersal allows for content associated with the Web application to be staged geographically close to requesting end users, and therefore to achieve significant throughput increases on a web application.

Typically, the core network 402 comprises various devices such as IDS/IPS 412, an HTTP server 414, and many others.

Generalizing, the architecture shown in FIG. 4 is used to support the Web application on first and second computing systems, with the first computing system then associated with the core 402, and the second computing system associated with the cloud 404.

Autonomic Exclusion in a Tiered Delivery Network

With the above as background, the technique of this disclosure is now described.

Figure 5:
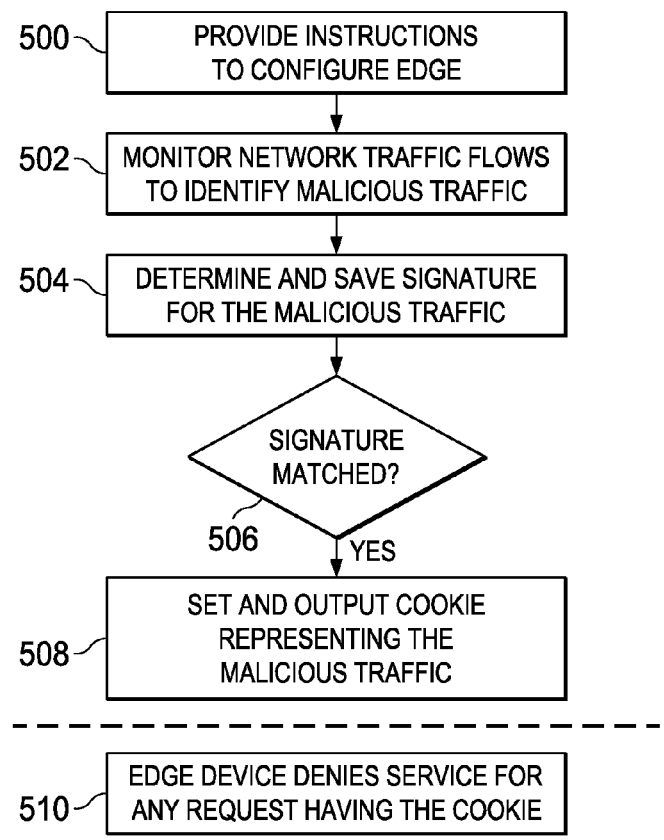
FIG. 5 depicts a process flow of the high level approach of this disclosure.

According to this disclosure, a device located away from the core (e.g., at the edge of a network) is dynamically reconfigured to block undesired traffic (e.g., an HTTP-based zero-day exploit) using control information that originates in the core. In this context, the device located away from the core typically is an edge server of a delivery network, although this is not a limitation. The control information originates in the core, for example, in a network IPS such as depicted in FIG. 3, although once again this is not a limitation either. At a high level, the technique of this disclosure is depicted by the process flow shown in FIG. 5.

At step 500, a device located in the cloud is configured or otherwise enabled to monitor for receipt of the control information (sometimes referred to as "signaling"). As noted above, typically the device is an edge server or some other cloud-based device that is located intermediate (i.e. between) a requesting client and elements positioned in or in association with the network core. The device is configured or enabled for the technique in an off-line manner, e.g., by being suitably programmed to monitor for and respond to receipt of the control information.

Returning back to FIG. 5, at step 502, the core element(s) monitors network flows to identify malicious traffic. The nature of this monitoring is described generally above (see, e.g., FIG. 3 and the related description). The particular traffic that is monitored may be request traffic to the web application, but this is not a requirement. As a result of the monitoring, the core element determines and saves a signature for any malicious traffic identified. A match against this signature then identifies traffic (bearing that signature) is potentially malicious. To this end, at step 506 a test is performed to determine whether the signature is matched, e.g., by a request directed to the web application. If so, control information to this effect is generated, typically in the form of a cookie that is set and output at step 508. As will be described, the cookie then makes its way back to the requesting client from which the matched traffic originates. If and when that requesting client later presents that cookie, any edge device that receives it can deny service. This denial of service is represented by step 510.

Thus, and according to this disclosure, the control information is provided to a requesting client in such a manner that the requesting client will accept it under the premise that it will be needed by the requesting client to obtain subsequent service. Preferably, this is accomplished by providing the control information to the requesting client in the form of a standards-based HTTP cookie, such as described in Internet RFC 2409, RFC 2965, RFC 6265, and others. When that control information is subsequently presented by the requesting client and received at the device (assuming it is), then edge device can then take one or more responsive actions. The nature of the responsive action(s) that are implemented at the edge device are not an aspect of this disclosure, although typically a responsive action will be to block (deny) the subsequent request, such as depicted at step 510.

Preferably, the control information is generated by executing the software components in the core element, such as the software described above in FIG. 3. The result of that detection process is a determination that traffic bearing a certain signature is likely malicious and thus should be denied (blocked). As noted, an indication to that effect is then associated with the control information (or the indication itself may be the control information), and that information is then output by the core device as an HTTP cookie.

According to this disclosure then, the control information is delivered to and instantiated in the edge device indirectly and, in particular, by the core element (e.g., network IPS) setting and returning to a requesting client an HTTP cookie in a conventional manner. Typically, the HTTP cookie passes through the edge device on its way back to the requesting client. The requesting client is sometimes referred to herein as an "HTTP agent." That agent may be a browser, a mobile app, or the like. In other words, and in the context of FIG. 3, it is assumed that the network IPS receives a request from the HTTP agent, executes the malicious software detection functionality, and then determines that the request is potentially malicious and should be blocked, in other words, that the agent is or may be malicious. This determination thus generates the "control information" or signaling that then is instantiated in the edge device. To that end, the core element responds to the request from the client with an HTTP cookie, as has been described. This operation returns the HTTP cookie to the requesting client, typically via the edge device itself, although this is not necessarily required. At this point, and as noted above, the system has determined that the requesting client likely is malicious. Instead of configuring the edge device directly (by the core, or otherwise), the edge device is then re-configured to address the threat indirectly. Because the edge device is pre-configured to recognize or monitor for the control information, when the requesting client later makes a subsequent request that gets redirected to the edge server (using standard CDN command and control processing), the subsequent request will include the HTTP cookie that has (or that is) the control information indicating the existence of the threat. The requesting client provides the cookie because it is assumed to be operating in a standards-compliant manner. Thus, when the receiving client later returns that cookie to the edge device to obtain subsequent service, the control information that originated at the core is used by the edge device to deny the requested service. This indirect cookie transport mechanism thus leverages the client agent (e.g., a web browser or mobile app) as the primary means to deliver the control information from the core to the edge device. Further, because the edge device is configured to recognize and respond to such cookies, the device can block the subsequent request for service or take some other configured action. Using this indirect method of communicating the control information (from the core to the requesting client and then back to the device), the edge device is reconfigured dynamically or "on-the-fly" as needed to address network exploits or other security threats.

Preferably, and as depicted at steps 502 and 504, once traffic matching a signature of malicious traffic is identified, that traffic is given an identifying marking or indicator to that effect by setting a cookie for traffic bearing this signature. Any HTTP agent that later presents that cookie is then potentially suspect, and any request associated therewith may be blocked.

Step 500 may be performed in an off-line manner, and there is no requirement that this step be carried out in a particular sequence.

The following are representative use cases for the above-described functionality. They are not intended to be limiting.

In a first example embodiment, the technique uses the presence of the cookie in association with an automatic attack detection scheme. The process begins with the edge devices (or other intermediaries) configured to take one or more prescribed actions, e.g., to reject all traffic containing a specific HTTP cookie (e.g. that includes a marking such as "I_AM_EVIL" that is otherwise not normally used). Subsequently, and at the core, some operating functionality, such as a log analysis routine, determines that traffic bearing a certain signature should be denied. A product such as IBM QRadar® may be used for this purpose. Alternatively, a security analyst may create the signature and instantiate it on the IDS/IPS that is executing in the core. The IDS/IPS, such as IBM Proventia, is configured to set a preferably HTTP cookie "I_AM_EVIL" for traffic bearing this signature. Of course, this particular nomenclature for the cookie name is merely exemplary, as any data string may be used and would work just as well (provided the core and edge devices are in agreement on the name of the cookie that is not otherwise used for some other purpose). This is the control information. The cookie may be a short-term cookie (having some given time-to-live), but this is not a limitation. The requesting HTTP agent that issued the original request then receives the cookie and returns it upon subsequent HTTP transactions (according to the standards-compliant behavior). When one or more of those transactions go through the edge device, the device executes the prescribed deny or other action to complete the process.

Figure 6:
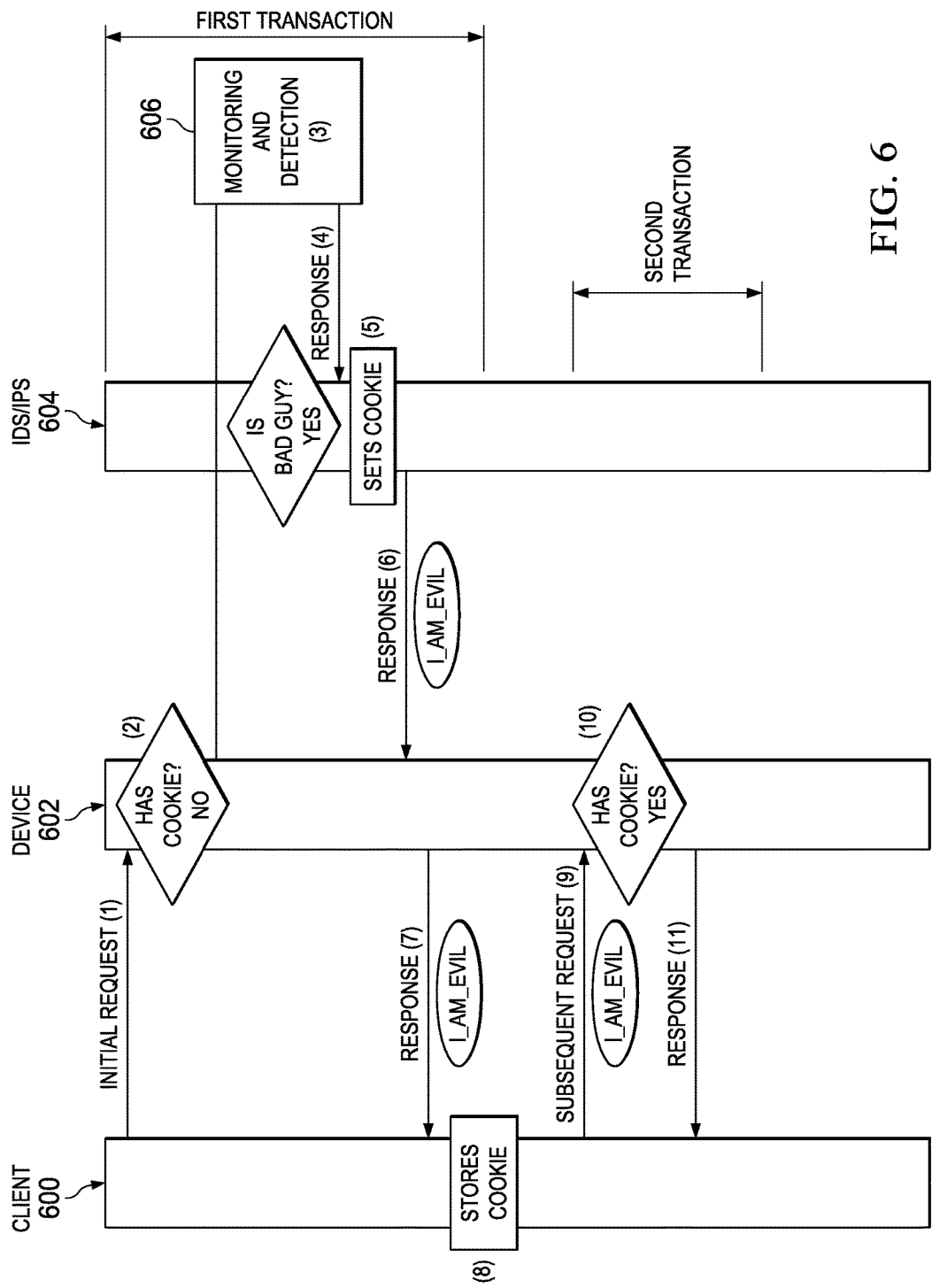
FIG. 6 depicts a first embodiment wherein an automated attack detection approach is used to generate the control information.

FIG. 6 depicts the above-described use case involving the automatic attack detection scheme. As depicted, there is an HTTP (user) agent 600, an edge or other intermediary device 602, an IDS/IPS 604, and a core-based element 606 that provides a malicious traffic detection functionality (e.g., IBM Proventia). It is assumed here that the edge device 602 has been configured to monitor for and respond to cookies that are associated with suspect HTTP agents, one of which may be user agent 600. At step (1), the HTTP agent makes an initial request, which is assumed to be directed to the edge device. In the alternative, this initial request may be received at the core. At step (2), the edge device tests whether any cookie received has (or represents) the control information. If not, and if the request must be processed upstream, the request is forwarded onward. At step (3), the malicious traffic detection functionality at element 606 determines that the traffic bears a signature indicative of a possible exploit. At step (4), a response to this effect is returned to the IDS/IPS 604. Steps (3) and (4) in effect test whether the requesting HTTP client is malicious. At step (5), the IDS/IPS 604 sets the cookie for traffic bearing the identified signature. At step (6), the HTTP cookie is returned to the edge device 602 as a response. Typically, the edge device 602 passes through to the requesting client information it receives from the upstream source. Thus, at step (7), the edge device 602 returns the cookie back to the HTTP client. At step (8), the requesting client stores the cookie for potential re-use; this is a standards-compliant behavior, as the HTTP agent assumes that the information received in response to the initial request is HTTP-compliant.

At step (9), the HTTP agent issues 600 a subsequent request for service and thus represents the I_AM_EVIL token. At step (10), the edge device 602 tests again for the presence of the cookie. On this occasion, unlike the negative outcome at step (2), the outcome is positive. Thus, and at step (11), the edge device 602 issues a response, typically denying service. Although not shown, the edge device may take some other action, e.g., issue a notification, write a log, or the like. This completes the processing.

In a second example embodiment, the technique uses the presence of the cookie in association with manual attack reaction facilities. Once again, the process begins with the edge devices (or other intermediaries) configured to take one or more prescribed actions, e.g., to reject all traffic containing a specific HTTP cookie that includes the marking (such as "I_AM_EVIL"). Now, assume that a security analyst (or some automated mechanism) identifies that an attack is underway and responds by defining the signature of the attacker. A core element, e.g., an HTTP server powered by Apache, is configured to set a short-term/session-based HTTP cookie "I_AM_EVIL." This is the control information. The requesting HTTP agent that issued the original request then receives the cookie and returns it upon subsequent HTTP transactions (once again, according to the standards-compliant behavior). When one or more of those transactions go through the edge device, the device executes the prescribed denial of service or other action to complete the process.

FIG. 7 depicts the flow for the above-described manual identification use case. As depicted, there is an HTTP (user) agent 700, an edge or other intermediary device 702, an HTTP server or other Web service 704, and a core-based security analyst or automated element 706 that identifies that an attack is underway and responds by defining the signature of the attacker. As before, it is assumed here that the edge device 702 has been configured to monitor for and respond to cookies that are associated with suspect HTTP agents, one of which may be user agent 700. At step (1), the HTTP agent makes an initial request, which is assumed to be directed to the edge device. At step (2), the edge device tests whether any cookie received has (or represents) the control information. If not, and if the request must be processed upstream, the request is forwarded onward for processing. At step (3), receiving HTTP server or Web service tests for the presence of the cookie that includes a marker or other identifier that the HTTP agent is malicious or otherwise suspect. Because the outcome of the test is negative, processing continues in the usual manner. Concurrently, however, the security analyst or automated system 706 determines that the traffic in this "first transaction" bears a signature indicative of a possible exploit. This is step (4). At step (5), the HTTP server/Web service 704 sets the cookie for traffic bearing the identified signature. At step (6), the HTTP cookie is returned to the edge device 702 as a response. Typically, and as noted above, the edge device 702 passes through to the requesting client information it receives from the upstream source. Thus, at step (7), the edge device 702 returns the cookie back to the HTTP client 700. At step (8), the requesting client stores the cookie for potential re-use; as noted above, this is a standards-compliant behavior, as the HTTP agent assumes that the information received in response to the initial request is HTTP-compliant.

At step (9), the HTTP agent issues 700 a subsequent request for service and thus represents the token, however designated. At step (10), the edge device 702 tests again for the presence of the cookie. On this occasion, unlike the negative outcome at step (2), the outcome is positive. Thus, and at step (11), the edge device 702 issues a response, typically denying service. This is depicted as the "second" transaction. Although not shown, the edge device may take some other action, e.g., issue a notification, write a log, or the like. This completes the processing.

In a third example embodiment, the technique uses a value in the cookie as the control information instead of the mere presence of the cookie. The process begins with the edge devices (or other intermediaries) configured to take one or more prescribed actions, e.g., to reject all traffic in which a specific HTTP cookie (e.g., JSESSIONID), which is normally used to match against a specific value, ends with some predetermined number (e.g., "0"). As with the prior embodiment, the choice of the JSESSIONID and/or the "ends in 0" notion are merely exemplary, as "ends in even" (or some other condition) would work just as well (provided the core and edge devices are in agreement on what the trigger condition is). Subsequently, and at the core, some operating functionality, such as a log analysis routine, determines that traffic bearing a certain signature should be denied. Alternatively, a security analyst may create the signature and instantiate it on the IDS/IPS that is executing in the core. The IDS/IPS, such as IBM Proventia, is configured to change the received HTTP cookie "JSESSIONID" value by appending a "0" for traffic bearing this signature. This then becomes the control information. The requesting HTTP agent that issued the original request then receives the cookie and returns it upon subsequent HTTP transactions (according to the standards-compliant behavior). When one or more of those transactions go through the edge device, the device executes the prescribed remedial/mitigation action to complete the process.

The process flow for the above example is similar to that shown in FIG. 6 except that the tests evaluate the cookie value instead of the presence or lack thereof of the cookie itself.

As another example embodiment, the process begins with the edge devices (or other intermediaries) configured to take one or more prescribed actions, e.g., to reject all traffic in which a specific HTTP cookie (e.g., JSESSIONID), which is normally used to match against a specific value, ends with some predetermined number (e.g., "0"). Subsequently, and at the core, a security analyst (or some automated functionality) identifies an attack is underway and, in response, defines the signature of the attacker. A web server (or other such device) is then configured to change the received HTTP cookie "JSESSIONID" value by appending a "0" for traffic bearing this signature. Once again, this is the control information. The requesting HTTP agent that issued the original request then receives the cookie and returns it upon subsequent HTTP transactions (according to the standards-compliant behavior). When one or more of those transactions go through the edge device, the device executes the prescribed remedial/mitigation action to complete the process.

Once again, the process flow for the above example is similar to that shown in FIG. 7 except that the tests evaluate the cookie value instead of the presence or lack thereof of the cookie itself.

Thus, depending on the implementation, the core element that sets the cookie or the cookie value may be a network security appliance such as an intrusion detection system (IDS), an intrusion prevention system (IPS), or the like that is capable of analyzing HTTP traffic, or any device capable of setting or modifying HTTP cookies (e.g., an Apache-based web server, a Web service), or the like. Other core elements that may be used include devices capable of performing prescribed actions based on presence of values of HTTP cookies, such as a firewall, a load balancer, a router, an HTTP proxy, or the like, a device capable of implementing a security policy, or the like. Likewise, the edge device that is configured by the disclosed indirect communication technique may be any intermediary element that can take mitigation or other remedial actions based on presence of HTTP cookies or the values therein.

Generalizing, the technique herein leverages HTTP cookies as a messaging conduit to cause a controlled device (e.g., the edge server) to be configured or re-configured based on the presence of a cookie (or some value therein) and thereby controlled by a controlling device (e.g., an IPS located at the core). The approach exploits the expected correct behavior of the HTTP client agent in cookie handling to effect a denial of service to that agent (for subsequent service requests that originate therefrom). Indeed, it is exactly the re-presentment of the cookie that denies the service, which is the opposite of the behavior that would be expected by the HTTP agent if operating according to conventional HTTP practices. The approach thus provides for a vendor-independent, standards-compliant mechanism to effect reconfiguration of a Web application's cloud-supported infrastructure.

Stated another way, according to this approach an edge node is configured to recognize the presence of a signal cookie set by another element (typically in the core) to indicate that a request from a client presenting that cookie (or cookie value) is actually an attack on the system.

Preferably, the edge device is configured to respond to the signature match cookie by receiving configuration instructions from a core element. Thus, in general the core element provides configuration instructions to the edge device, operates to test for the attack, generates the cookie based on matching a signature, and then outputs the cookie. The remaining denial-of-service operations occur automatically as a consequence of the HTTP agent cookie handling, by which the cookie is re-presented to obtain subsequent service and the edge device denies that service because it has been instructed to do so.

The technique herein has significant advantages. In particular, by using the browser (or other malicious client user agent) as a communication mechanism for the control signalizing between disparate autonomous systems (e.g., the origin (core) and the edge device), the signature that describes the unwanted client or traffic changes is delivered to the device that can address it effectively. The approach in effect splits the detection portion (which occurs at the core) from the action portion (which can then occur at the edge).

The method advantageously provides quick reaction to nascent situations or nuisance traffic (e.g., such as screen scrapers), and it relies on the surreptitious meaning of the control information signal. In effect, the approach herein tricks the malicious entity into accepting the offered cookie as a promise of further service, when in fact the technique intends to cause subsequent services to the entity to be interrupted. The approach can be implemented effectively even if knowledge of the technique becomes known to malicious entities. In this regard, because the enforcement mechanism may use the cookie value (in lieu of the cookie per se), the approach can still be implemented effectively.

The approach herein enables quick reconfiguration of the web application infrastructure even if located away from the core to respond to an attack signature. To effect this result, all that is required is for the core element to set a cookie based on matching a signature.

As noted above, the control information may be the cookie itself, or some value in the cookie. In an alternative, the control information may be a set of values for a given cookie, a function applied to one or more values, or even a set of values across multiple cookies. The nature of the control information may thus vary depending on the implementation provided the edge device is then configured appropriately to respond to receipt of the signaling.

The particular technique by which the core element creates the cookie is not a limitation. Any convenient technique to set, reset or modify a cookie based on matching a signature may be used. When the core element is an HTTP server running Apache, the cookie can be set by executing the mod_rewrite component.

This subject matter may be implemented as-a-service. As previously noted, and without limitation, the subject matter may be implemented within or in association with a cloud platform system or appliance. The signature match and cookie generation function may be provided as a standalone function, or it may leverage functionality from core-based products and services.

As noted, a representative cloud application platform with which the technique may be implemented includes, without limitation, any cloud-supported IPS/IDS framework, product or service.

Generalizing, the techniques herein may be implemented as a management solution, service, product, appliance, device, process, program, execution thread, or the like. Typically, the techniques are implemented in software, as one or more computer programs executed in hardware processing elements, in association with data stored in one or more data sources, such as a problems database. Some or all of the processing steps described may be automated and operate autonomously in association with other systems. The automation may be full- or partial, and the operations (in whole or in part) may be synchronous or asynchronous, demand-based, or otherwise.

These above-described components typically are each implemented as software, i.e., as a set of computer program instructions executed in one or more hardware processors. The components are shown as distinct, but this is not a requirement, as the components may also be integrated with one another in whole or in part. One or more of the components may execute in a dedicated location, or remote from one another. One or more of the components may have sub-components that execute together to provide the functionality. There is no requirement that particular functions of the auto-tuning service be executed by a particular component as named above, as the functionality herein (or any aspect thereof) may be implemented in other or systems.

As noted, the basic functionality can interact or interoperate with security systems or services.

As has been described, the functionality described above may be implemented as a standalone approach, e.g., one or more software-based functions executed by one or more hardware processors, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF).

As noted, and in addition to the cloud-based environment, the techniques described herein may be implemented in or in conjunction with various server-side architectures including simple n-tier architectures, web portals, federated systems, and the like.

Still more generally, the subject matter described herein can take the form of an entirely hardware embodiment, an entirely software embodiment or an embodiment containing both hardware and software elements. In a preferred embodiment, the security assurance service (or any component thereof) is implemented in software, which includes but is not limited to firmware, resident software, microcode, and the like. Furthermore, the download and delete interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the techniques are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein provide for improvements to another technology or technical field, namely, web application delivery systems, as well as improvements to the functioning of attack detection and mitigation systems themselves.

Having described our invention, what we now claim is as follows.

The invention claimed is:

1. A method to protect a web application that is supported across autonomous first and second computing systems, comprising:
monitoring network flows to detect malicious traffic;
determining and storing a signature for the malicious traffic;
upon receipt from a requesting client of a request received in association with a first computing system and directed to the web application, determining whether the request matches the signature;
when the request matches the signature, generating control information, the control information being a data string agreed upon by the first and second computing systems and indicating that traffic bearing the signature has been matched; and
in lieu of the first computing system configuring the second computing system to respond to the malicious traffic directly, outputting the control information from the first computing system for return to the requesting client, the second computing system having been configured in advance to monitor for receipt of the control information, and further configured to deny service upon any subsequent receipt of the control information at the second computing system from the requesting client.

2. The method as described in claim 1 wherein the control information is output as an HTTP cookie.

3. The method as described in claim 1 wherein the control information is output as one or more values associated with an HTTP cookie.

4. The method as described in claim 1 wherein the first computing system is associated with one of: an intrusion prevention system, and an intrusion detection system, and wherein the second computing system is associated with an edge device.

5. The method as described in claim 1 wherein the malicious traffic is a zero day attack.

6. The method as described in claim 1 wherein a determination whether the request matches the signature is made by a manual or automated process.

7. The method as described in claim 1 further including providing instructions from the first computing system to the second computing system to facilitate the second computing system being configured to deny service, the instructions identifying the control information.

8. Apparatus, comprising:
a processor;
computer memory holding computer program instructions executed by the processor to protect a web application that is supported across autonomous first and second computing systems, the computer program instructions operative to:
monitor network flows to detect malicious traffic;
determine and store a signature for the malicious traffic;
upon receipt from a requesting client of a request received in association with a first computing system and directed to the web application, determine whether the request matches the signature;

when the request matches the signature, generate control information, the control information being a data string agreed upon by the first and second computing systems and indicating that traffic bearing the signature has been matched; and in lieu of the first computing system configuring the second computing system to respond to the malicious traffic directly, output the control information from the first computing system for return to the requesting client, the second computing system having been configured in advance to monitor for receipt of the control information, and further configured to deny service upon any subsequent receipt of the control information at the second computing system from the requesting client.

9. The apparatus as described in claim 8 wherein the control information is output as an HTTP cookie.

10. The apparatus as described in claim 8 wherein the control information is output as one or more values associated with an HTTP cookie.

11. The apparatus as described in claim 8 wherein the first computing system is associated with one of: an intrusion prevention system, and an intrusion detection system, and wherein the second computing system is associated with an edge device.

12. The apparatus as described in claim 8 wherein the malicious traffic is a zero day attack.

13. The apparatus as described in claim 8 wherein a determination whether the request matches the signature is made by a manual or automated process.

14. The apparatus as described in claim 8 wherein the computer program instructions are further operative to provide instructions from the first computing system to the second computing system to facilitate the second computing system being configured to deny service, the instructions identifying the control information.

15. A computer program product in a non-transitory computer readable medium for use in a data processing system, the computer program product holding computer program instructions executed by the data processing system to protect a web application that is supported across autonomous first and second computing systems, the computer program instructions operative to:

monitor network flows to detect malicious traffic;

determine and store a signature for the malicious traffic;

upon receipt from a requesting client of a request received in association with a first computing system and directed to the web application, determine whether the request matches the signature;

when the request matches the signature, generate control information, the control information being a data string agreed upon by the first and second computing systems and indicating that traffic bearing the signature has been matched; and in lieu of the first computing system configuring the second computing system to respond to the malicious traffic directly, output the control information from the first computing system for return to the requesting client, the second computing system having been configured in advance to monitor for receipt of the control information, and further configured to deny service upon any subsequent receipt of the control information at the second computing system from the requesting client.

16. The computer program product as described in claim 15 wherein the control information is output as an HTTP cookie.

17. The computer program product as described in claim 15 wherein the control information is output as one or more values associated with an HTTP cookie.

18. The computer program product as described in claim 15 wherein the first computing system is associated with one of: an intrusion prevention system, and an intrusion detection system, and wherein the second computing system is associated with an edge device.

19. The computer program product as described in claim 15 wherein the malicious traffic is a zero day attack.

20. The computer program product as described in claim 15 wherein a determination whether the request matches the signature is made by a manual or automated process.

21. The computer program product as described in claim 15 wherein the computer program instructions are further operative to provide instructions from the first computing system to the second computing system to facilitate the second computing system being configured to deny service, the instructions identifying the control information.

\* \* \* \* \*